US006314811B1

(12) United States Patent
Goldner et al.

(10) Patent No.: US 6,314,811 B1

(45) Date of Patent: Nov. 13, 2001

(54) ACOUSTIC SENSOR MODULE DESIGN AND FABRICATION PROCESS

(75) Inventors: Eric Lee Goldner, Valencia; Joseph Scott Salinas, Granada Hills, both of CA (US)

(73) Assignee: Litton Systems Inc., Woodland Hills, CA (US)

(*) Notice: Subject to any disclaimer, the term of this patent is extended or adjusted under 35 U.S.C. 154(b) by 0 days.

(21) Appl. No.: 09/490,866

(22) Filed: Jan. 24, 2000

(51) Int. Cl.[7] .......... G01H 15/00; H04R 11/00

(52) U.S. Cl. .......... 73/570; 73/649; 367/188

(58) Field of Search .......... 73/570, 589, 773, 73/181, 649, 432.1; 367/89, 90, 91, 188, 152; 310/328

(56) References Cited

U.S. PATENT DOCUMENTS 4,674,595 6/1987 Henriquez .......... 181/286
4,823,327 * 4/1989 Hilmers .......... 367/157
5,150,335 9/1992 Hoffman .......... 367/101
5,235,557 * 8/1993 Masreliez .......... 367/91
5,247,490 * 9/1993 Goepel et al. .......... 367/149
5,335,209 8/1994 Jaenke et al. .......... 367/155
5,581,515 * 12/1996 Masreliez .......... 367/89
5,838,635 * 11/1998 Masreliez .......... 367/89
5,959,294 9/1999 Green et al. .......... 250/227.27
6,043,917 * 3/2000 Sonderegger et al. .......... 359/168
6,134,281 10/2000 Green et al. .......... 375/347

* cited by examiner

*Primary Examiner*—Daniel S. Larkin
*Assistant Examiner*—Jacques Saint-Surin
(74) *Attorney, Agent, or Firm*—Bright & Lorig P.C.; David M. Kleiman

(57) ABSTRACT

The design and method of fabrication for an acoustic sensor module for mounting on the hull of a submarine or surface ship is disclosed. The design involves the use of molded alignment structures within a two part rubber shell to reduce tooling requirements and eliminate a significant amount of assembly labor in fabricating hull mounted sonar arrays.

19 Claims, 12 Drawing Sheets

ACOUSTIC SENSOR MODULE DESIGN AND FABRICATION PROCESS

FIELD OF THE INVENTION

The field to which the invention relates is that of hull mounted acoustic sensor modules for submarines and surface ships.

BRIEF SUMMARY OF THE INVENTION

This invention relates to a design and fabrication method of a low cost acoustic sensor module for shipboard acoustic sensor arrays. The invention uses molded in alignment features within a rubber shell to align and position acoustic sensors during the assembly process. The use of molded in alignment features eliminates numerous labor intensive steps which would otherwise be required to fabricate the sensor module when positioning the acoustic sensors with external tooling fixtures.

DETAILED DESCRIPTION OF THE INVENTION

Figure 1:
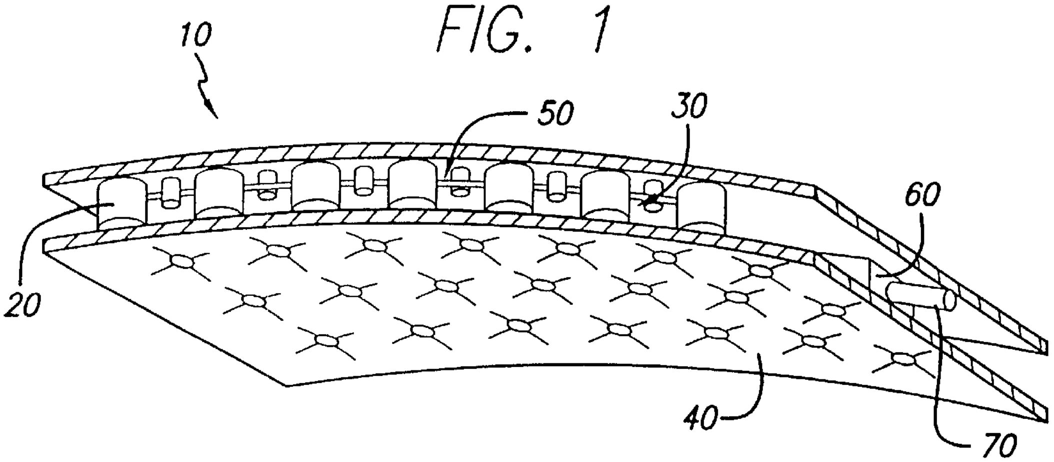
FIG. 1 A cutaway side elevation view of the acoustic sensor module.
Figure 2:
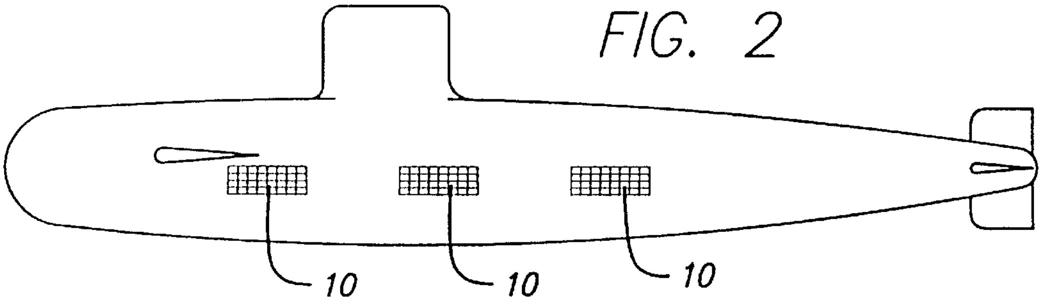
FIG. 2 A side view of the acoustic sensor module of FIG. 1 placed on the hull of a submarine as part of a sensor array.

The invention is a design and fabrication method for an acoustic sensor module. As shown in FIG. 1, acoustic sensor module 10 comprises a number of acoustic sensors 20 encapsulated within acoustically conductive medium 30 which is surrounded by outer protective shell 40. Acoustic sensors 20 are connected by telemetry lines 50 to telemetry module 60 located within shell 40, but which has connector 70 which extends outside of shell 40 allowing for connection between sensors 20 and an external system (not shown) for reading sensors 20. Acoustic sensor module 10 is mounted on the hull of a submarine or surface ship, often as part of a larger sensor array, as shown in FIG. 2.

A number of different materials can be used in fabricating the invention. In a preferred embodiment a tough rubber material which can be molded, such as nitrile rubber (Buna), is utilized for shell 40. Acoustic medium 30 used to encapsulate sensors 20 in shell 40 may be a urethane, such as Cortauld's PRC-1547 or Thorodin Inc.'s NGD-9. Both shell 40 and acoustic medium 30 should have a sound velocity that is less than that of sea water, a density comparable to sea water, be able to be molded, and capable of withstanding marine environments.

The encapsulation of sensors 20 in acoustic medium 30 requires precise positioning tolerances (on the order of 0.025 inches in any direction). In the present invention, positioning of sensors 20 for encapsulation is accomplished by features molded onto interior surfaces of shell 40.

Figure 3:
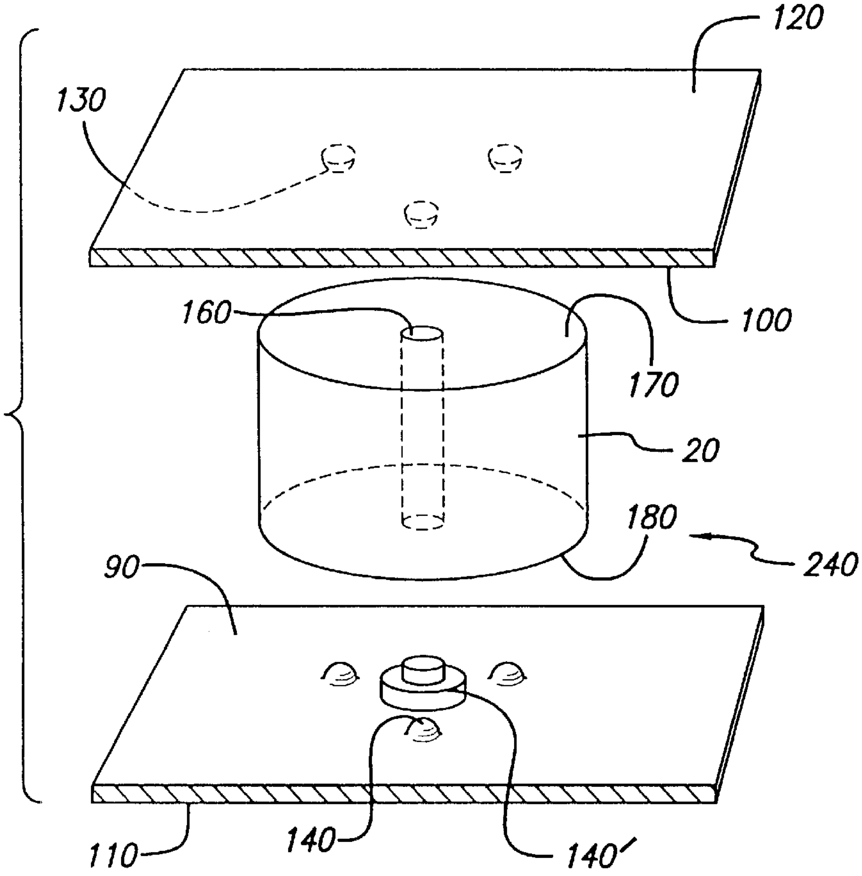
FIG. 3 An exploded cutaway side elevation view of the acoustic sensor module of FIG. 1 showing a configuration of upper and lower bosses used to position an acoustic sensor.

As shown in FIG. 3, each sensor 20 is positioned within the inner volume 240 surrounded by shell 40 by a set of lower bosses 140 and upper bosses 130 molded on the interior surfaces of shell 40. Shell 40 is composed of upper portion 120 and lower portion 110. In fabricating lower portion 110 lower bosses 140 are molded into interior surface 90. Likewise, upper bosses 130 are molded into interior surface 100 of upper portion 120. Upper bosses 130 and lower bosses 140 are molded with high dimensional tolerances necessary to position sensors 20 within inner volume 240.

Figure 4:
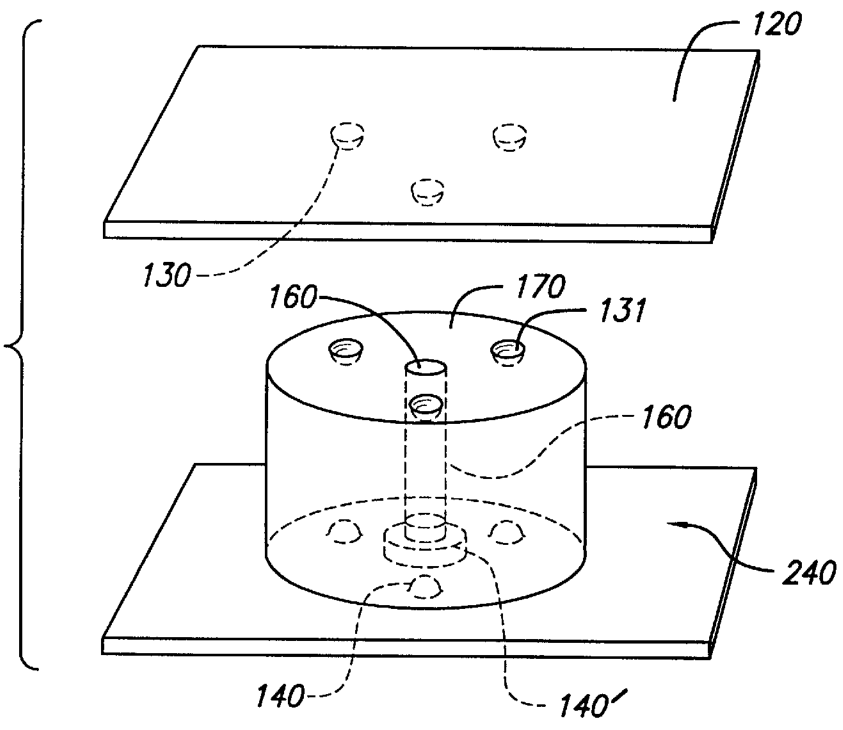
FIG. 4 An exploded cutaway side elevation view of the acoustic sensor module of FIG. 1 showing an acoustic sensor positioned on lower bosses.
Figure 17:
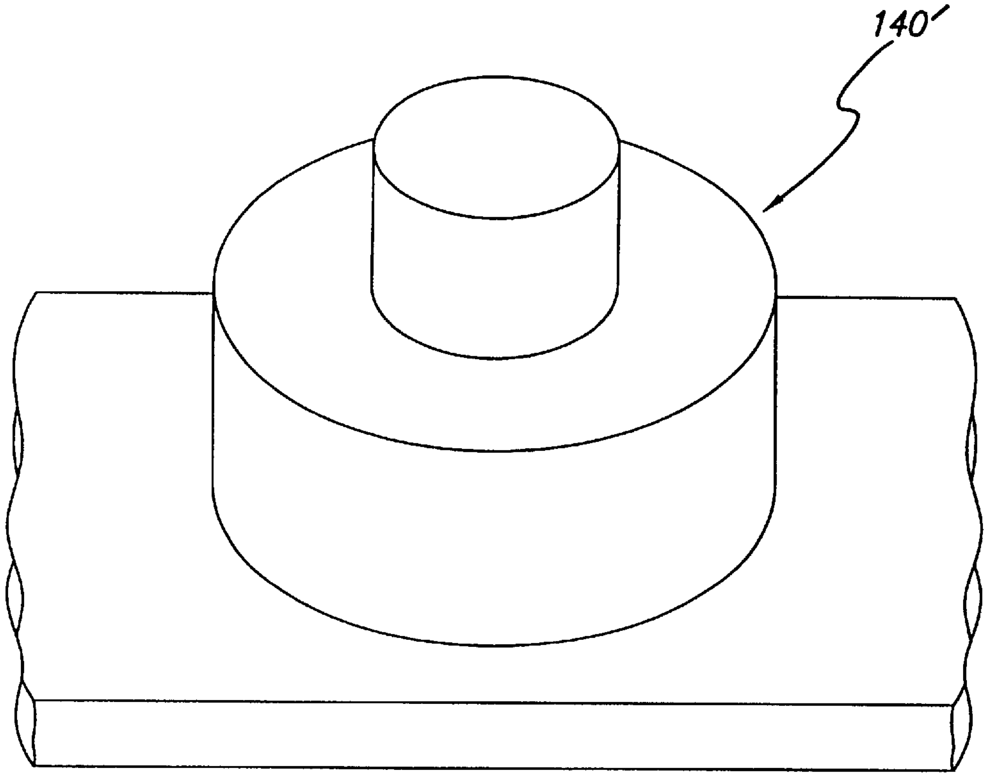
FIG. 17. A perspective view of a shoulder boss.
Figure 18:
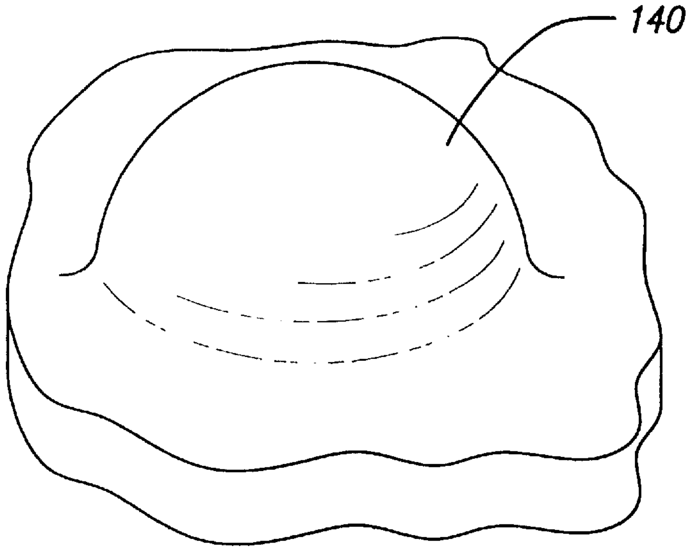
FIG. 18. A perspective view of a boss.

A preferred embodiment of the invention is shown in FIG. 4, where each sensor 20 is positioned within inner volume 240 between three (3) upper bosses 130 and four (4) lower bosses 140. In this preferred embodiment one of the four (4) lower bosses 140, a shoulder boss 140', is molded in a shape adapted to join with opening 160 in sensor 20 to form an interference fit. One possible shape of shoulder boss 140' is shown in FIG. 17. The interference fit may be facilitated by a threaded interior surface of opening 160. The remaining six (6) upper bosses 130 and lower bosses 140 are preferably hemispherical in shape, as shown for example in FIG. 18, and press against upper surface 170 and lower surface 180 of sensor 20 to precisely locate sensor. An alternate embodiment includes hemispherical depressions 131 in upper surface 170 and/or lower surface 180 that mate with upper bosses 130 and lower bosses 140 respectively, as shown for example in FIG. 4. Shoulder boss 140' limits horizontal travel of sensor 20 prior to curing of acoustic medium 30, with the other upper bosses 130 and lower bosses 140 limiting tilting of sensor 20. The shoulder of shoulder boss 140' is located below the final resting position of lower surface 180 of sensor 20 such that shoulder boss 140' defines only the transverse location of sensor 20, with remaining lower bosses 140 defining the vertical displacement of sensor 20 from interior surface 90 of lower portion 110. An alternative embodiment of the invention would use three (3) lower bosses 140 and four (4) upper bosses 130, with shoulder boss 140' being molded into the interior surface 100 of upper portion 120.

Figure 5:
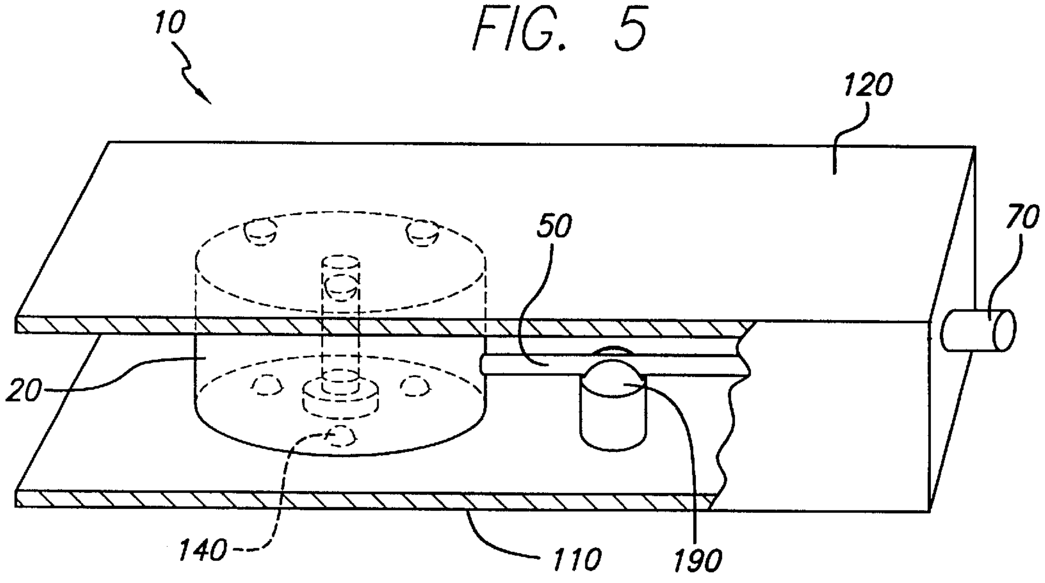
FIG. 5 An exploded side elevation cutaway view of the acoustic sensor module of FIG. 1 showing the connection of an acoustic sensor by a telemetry line through a routing boss to the telemetry module.
Figure 6:
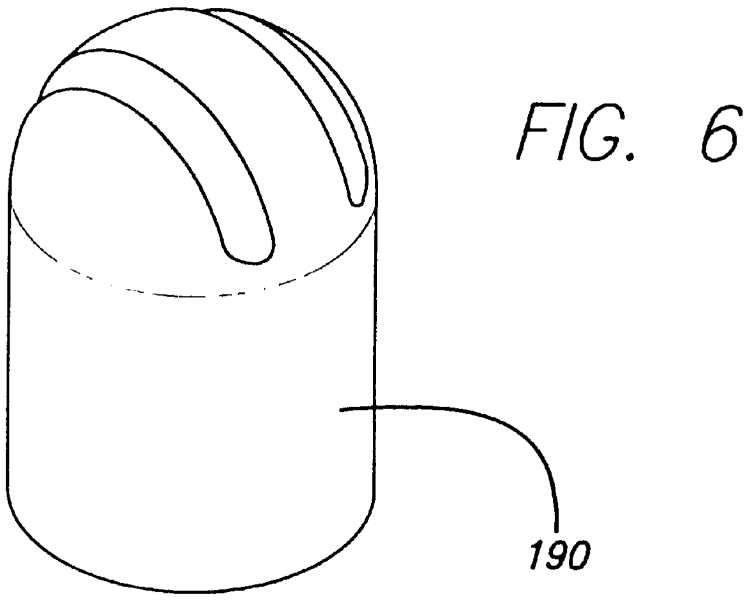
FIG. 6 A perspective view of a routing boss.
Figure 7:
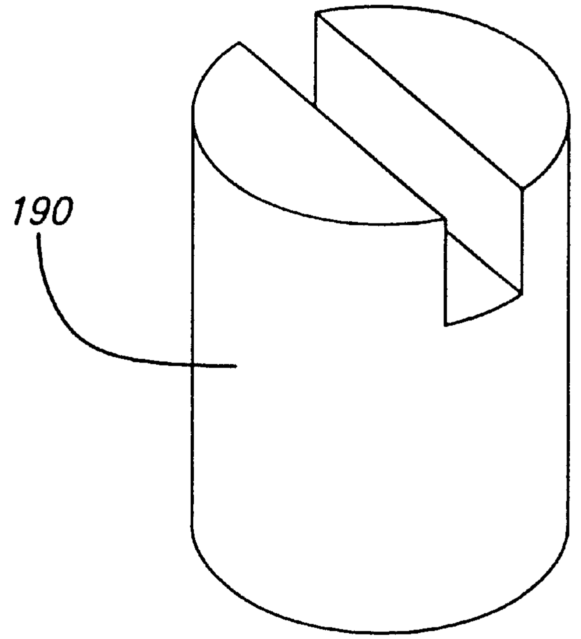
FIG. 7 A perspective view of an alternative routing boss.

An additional feature of a preferred embodiment of the invention are routing bosses 190, as shown for example in FIG. 5. Routing bosses 190 are molded features in interior surface 90 of lower portion 110 of shell 40 used to route telemetry lines 50 between sensors 20 and telemetry module 60. Routing bosses 190 may also be molded features in interior surface 100 of upper portion 120. Telemetry lines 50 may be comprised of buffered or cabled optical fiber, copper wire cable, or a combination thereof, depending upon the transduction mechanism of the sensor. Telemetry module 60 is preferably a pressure-barrier enclosure containing optical couplers and/or optical amplifiers and optical fiber splices. It may also contain amplification and multiplexing electronics if electrical or piezoelectric sensors are used. FIG. 6 shows, for example, a preferred shape of a routing boss 190. FIG. 7 shows an alternative shape of routing boss 190. A number of shapes may be used for routing boss 190, with the shape and size varying with the particular type, number and size of telemetry lines 50 being routed, and the details of the injection molding process used.

Figure 8:
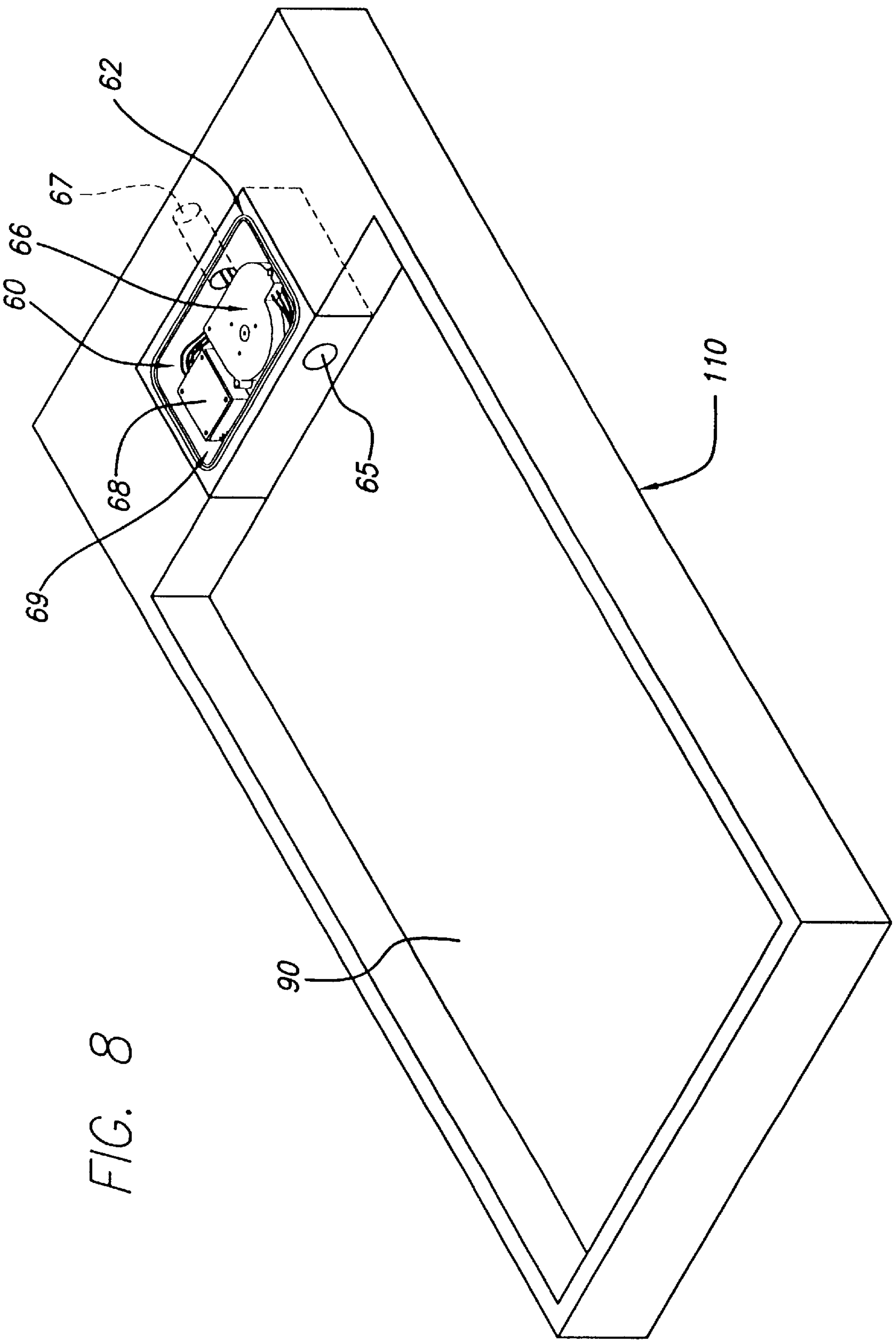
FIG. 8 A perspective view of the interior surface of the lower portion of the protective shell of the acoustic sensor module of FIG. 1 showing the telemetry module vulcanized into the lower portion.
Figure 16:
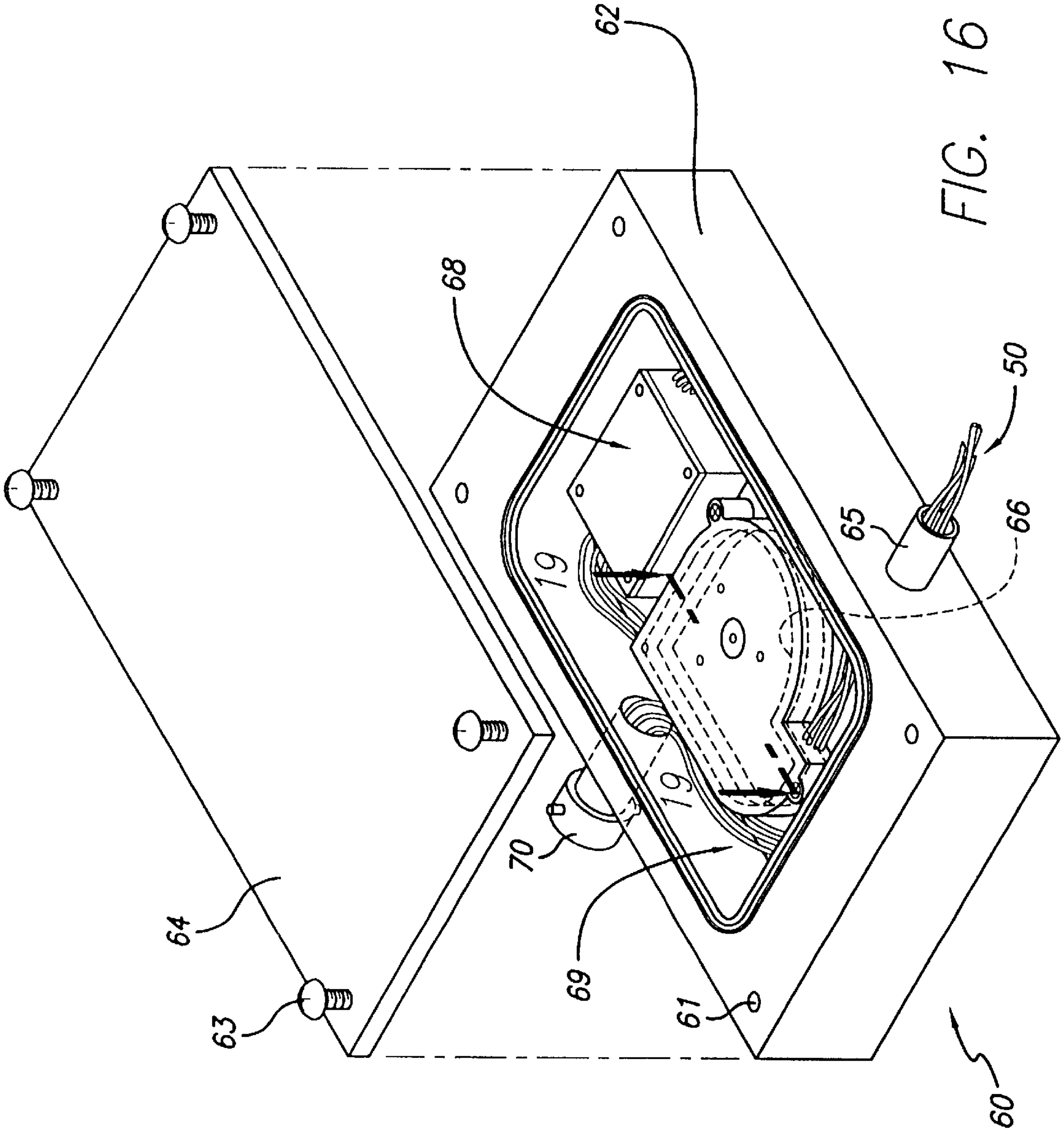
FIG. 16. A perspective view of a telemetry module bottom portion and lid portion.
Figure 19:
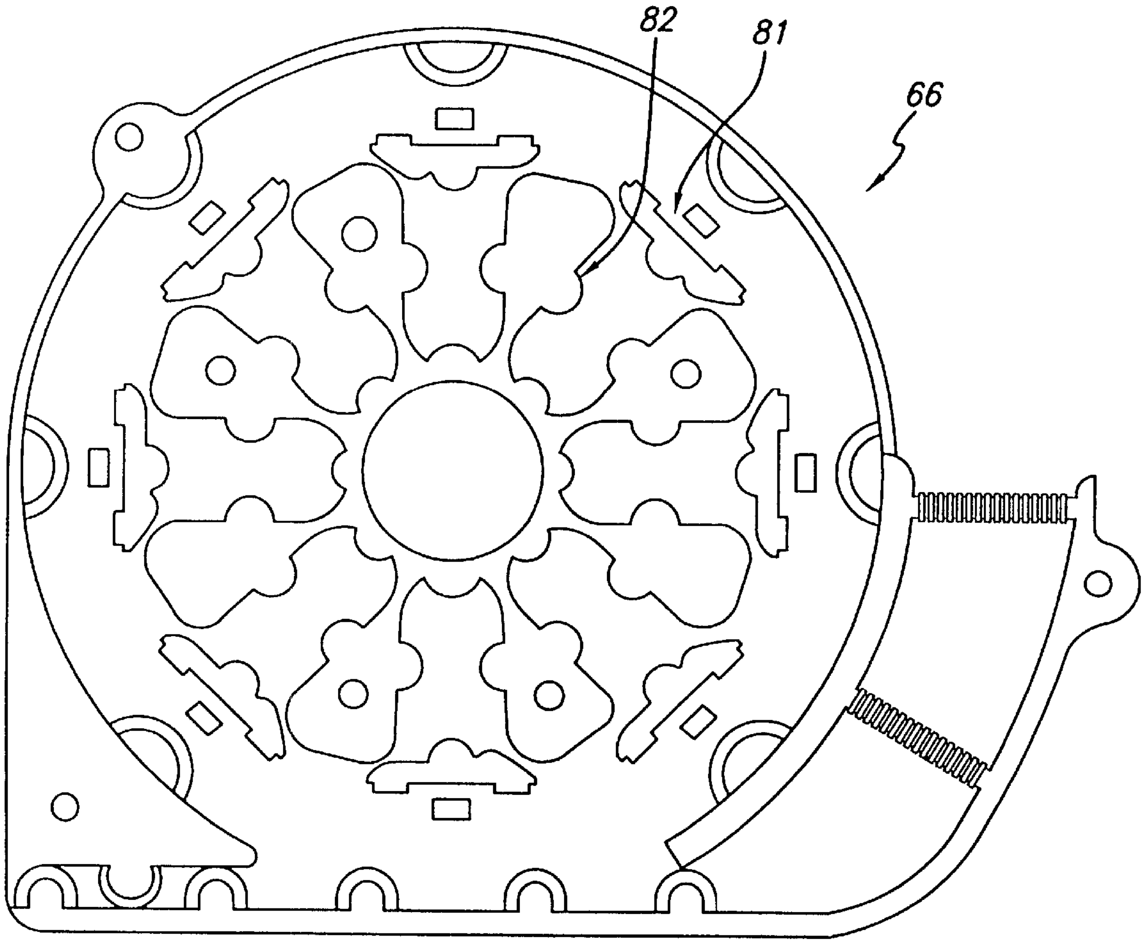
FIG. 19. A top view of a splice tray.

Telemetry module 60 has a bottom portion 62 and a lid portion 64, as shown for example in FIG. 16. Lid portion 64 and bottom portion 62 contain openings 61, possibly threaded, for receiving fasteners 63 (such as screws) for joining bottom portion 62 to lid portion 64 after telemetry lines 50 have been connected. Bottom portion of 62 of telemetry module 60 is preferably vulcanized into interior surface 90 of lower portion 110 of the shell during fabrication of the lower portion, as shown for example in FIG. 8. Alternatively, telemetry module 60 may be vulcanized or otherwise placed into interior surface 100 of upper portion 120. Access hole 65 in telemetry module bottom portion 62 may be used for routing of telemetry lines 50. Access hole 67 may be molded into lower portion 110 of shell 40 to facilitate location of multiple pin fiber optic connector as shown for example in FIG. 16. However, alternative means of positioning telemetry module 60 within lower portion 110 may be used by those practicing the invention. One such example would be molding a slot into interior surface 90 of lower portion 110 for receiving bottom portion 62 of telemetry module 60. In a preferred embodiment, telemetry module 60 contains a stack 66 of splice trays 71 and a coupler housing 68 within a cavity 69 contained within bottom portion 62. The splice trays 66, contain a series of clips 81 and overhanging projections 82 used to contain and organize splices, which may number around one hundred, and the associated optical fiber leads in a manner consistent with rapid replacement of failed splices and couplers following manufacture. The splice tray stack 66 has a lid 72 for protection of the assembly during handling. An example of a splice tray is shown in FIG. 19.

Figure 9:
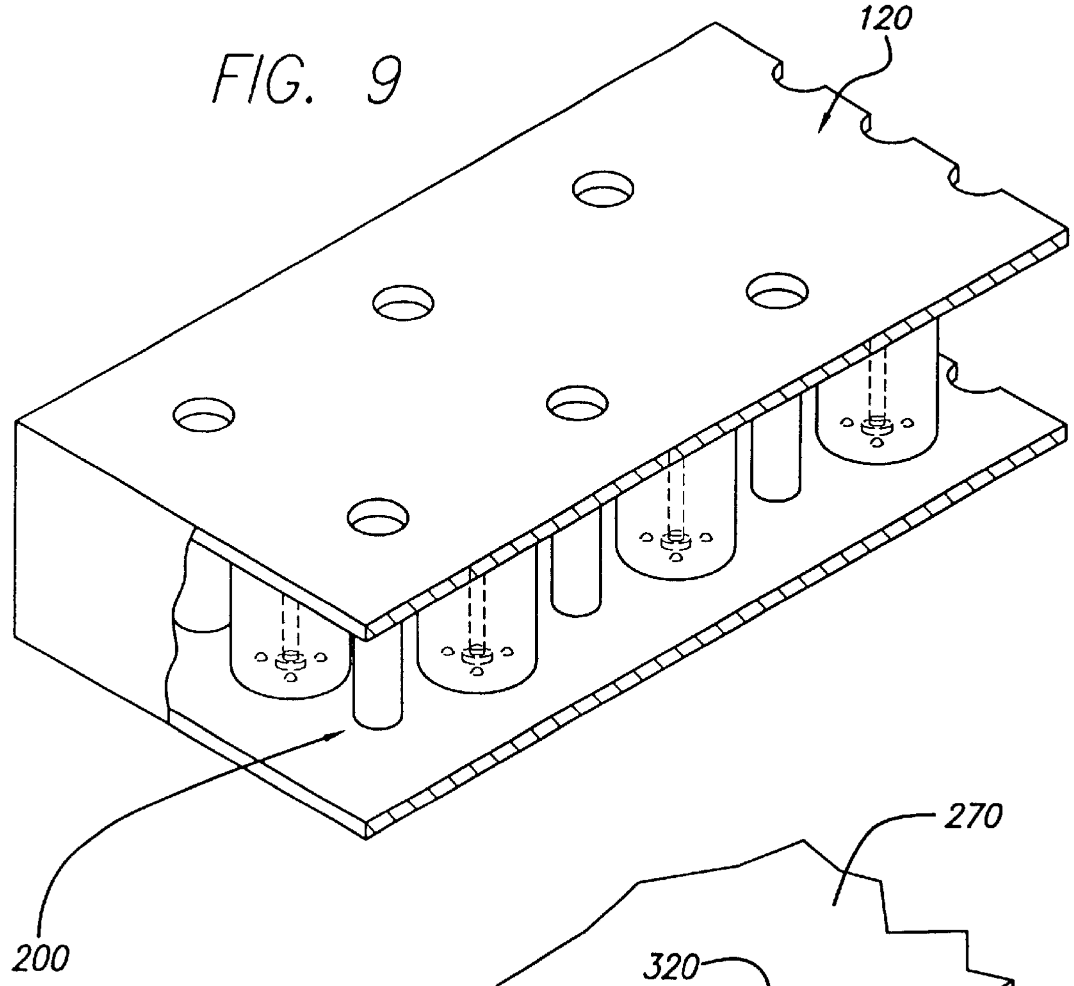
FIG. 9 A side elevation perspective view of the acoustic sensor module of FIG. 1 showing the sensors and open channels through the sensor module.
Figure 10:
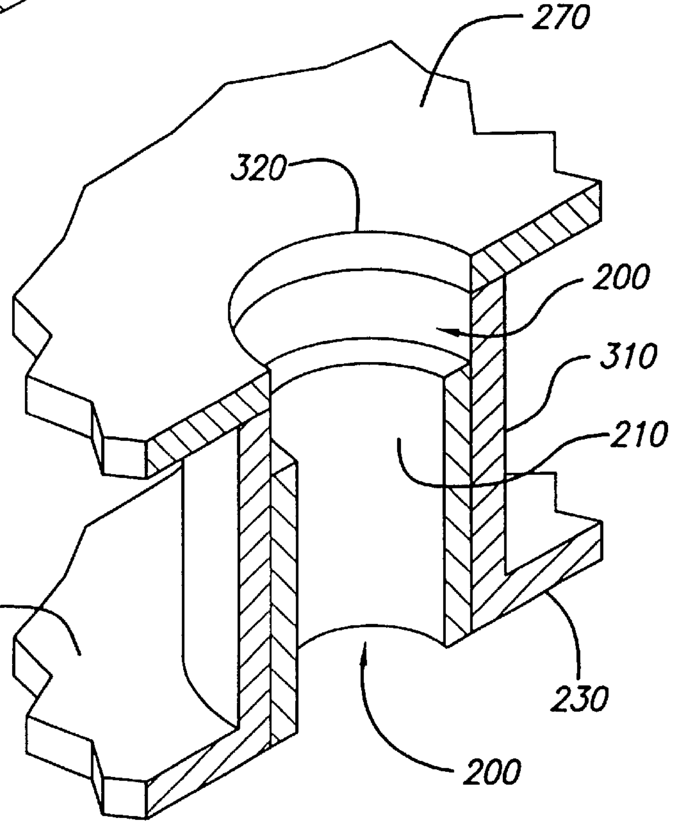
FIG. 10 An exploded cross section of an open channel of the acoustic sensor module of FIG. 1 showing the rigid insert within the open channel.

FIG. 9. shows, for example, another preferred embodiment of the invention which utilizes open channels 200 through sensor module 10 to facilitate installation of sensor module 10 onto the hull of a ship. Open channels 200 are comprised of lower channels 310 molded into lower portion 110 and upper channels 320 molded into upper portion 120, as shown for example in FIG. 10. Open channels 200 provide a means to attach sensor module 10 to a hull with fasteners (such as bolts) which pass through open channels 200. Open channels 200 are molded into shell 40 and may have an inner reinforcement piece 210 (such as a titanium tube), as shown, for example, in FIG. 10.

Figure 11:
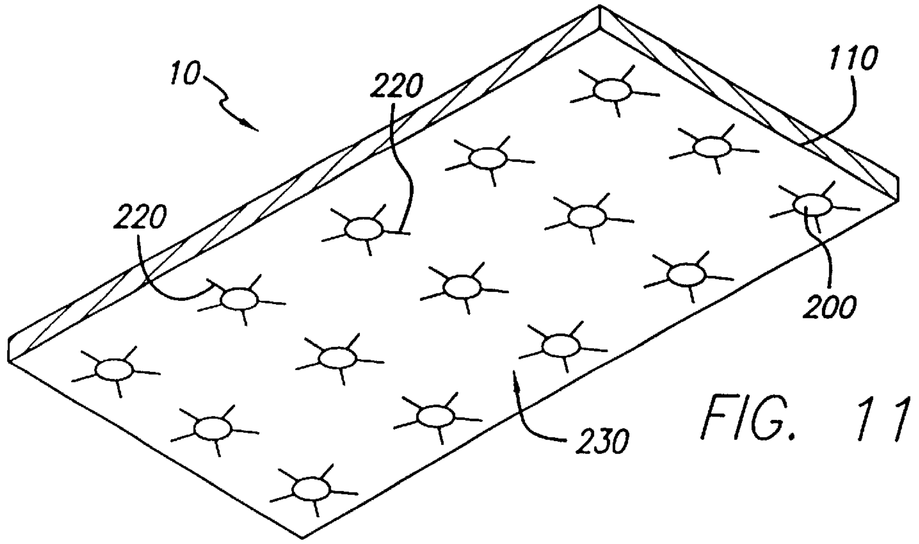
FIG. 11 A perspective view of the exterior surface of the lower portion of the acoustic sensor module of FIG. 1 showing the grooves extending radially outward from the open channels.

Open channels 200 may also be used for installing sensor module 20 to a hull with an adhesive. Bonding to the hull is accomplished by applying an adhesive coating to exterior surface 230 of lower portion 110 and the hull. Lower portion 110 of sensor module 10 is positioned against the hull, and a vacuum is drawn through open channels 200. This will result in sensor module 10 being securely “pressed” or “drawn” against the hull while the adhesive cures. When using such a vacuum method of installation it may be desirable to have grooves 220 in exterior surface 230 of lower portion 110 which extend radially outward from channels 200, as illustrated, for example, in FIG. 11. Grooves 220 extending outward from channels 200 increase the surface area between sensor module 10 and the hull of the ship, thereby distributing the vacuum over a wider area to hold module 10 against the hull. Pressure injection of adhesive may also be used to attach module 10 to hull with the use of periodic standoffs between the module 10 and hull. Open channels 200 can be used to facilitate this method by serving as conduits or vents for acoustic medium 30. A combination of fasteners and adhesive may also be used, with some open channels 200 being occupied by fasteners (such as bolts), and the remainder being used as vacuum lines.

One of the primary advantages of this invention is that it may be fabricated inexpensively and with minimum labor. A first step in fabricating the invention is the fabrication of lower portion 110 and upper portion 120 of shell 40. As stated above, the upper portion 120 and lower portion 110 may be made of a tough rubber material capable of being molded. Upper bosses 130, lower bosses 140, routing bosses 190, open channels 200, grooves 220 and telemetry module 60 may all be molded into the interior and exterior surfaces of upper portion 120 and/or lower portion 110 of shell 140. The result will be upper portion 120 and lower portion 110 with the desired, or necessary, molded features used for (1) positioning sensors 20 within inner volume 240 of shell 40, (2) routing telemetry lines 50, (3) injecting acoustic medium 30 into inner volume 240 to encapsulate sensors 20, and (4) installing finished sensor module 10 onto the ship hull. By having all of these features molded into upper portion 120 and lower portion 110 of shell 40, the need for multiple tooling sets is eliminated, greatly reducing cost. Fabrication labor is also greatly reduced.

Figure 12:
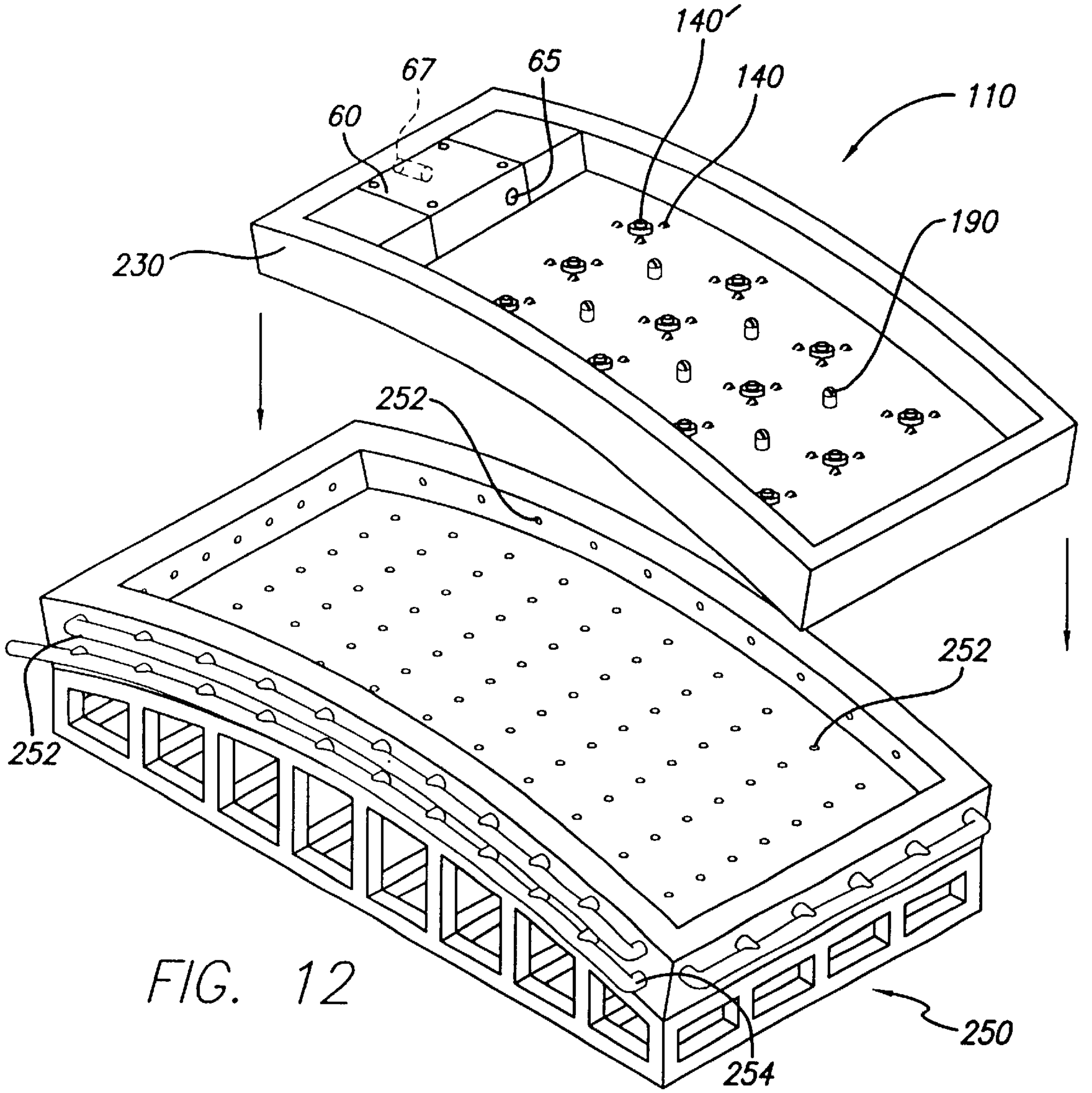
FIG. 12 An exploded view of the lower portion of the acoustic sensor module of FIG. 1 and first fixture.

Once lower portion 110 of shell 40 is fabricated, lower portion 110 is secured by its exterior surface 230 onto first fixture 250, as shown for example in FIG. 12. First fixture 250 may be flat, however in a preferred embodiment of the invention the surface of first fixture 250, upon which lower portion 110 is placed, is curved as shown in FIG. 12. The curvature of the first fixture 250 surface should match the curvature of the hull section to which sensor module 10 will be attached. Integral to first fixture 250 are vacuum lines 252 through which a vacuum is drawn to secure lower portion 110 to first fixture 250 during assembly and the injection molding process. Conductive heating elements 254 may be included in the interior of the fixture 250 to provide elevated temperature to acoustic medium 30 during curing.

Once lower portion 110 is secured to first fixture 250 sensors 20 are positioned onto molded lower bosses 140. It is anticipated that positioning of sensors 20 is done manually, although this does not preclude the use of automation to position sensors 20 onto lower bosses 140 if this is desired or necessary. As shown, for example, in FIG. 3, in a preferred embodiment of the invention there is at least one molded shoulder boss 140' for each sensor 20 adapted for joining with sensor 20 by an interference fit. The interference fit may be achieved by providing a suitable threaded opening 160 in sensor 20 and inserting at least a portion of shoulder boss 140' into opening 160. The portion of shoulder boss 140' inserted into opening 160 should be of a diameter to fill opening 160 such that sufficient friction forces will exist between shoulder boss 140' and the walls of opening 160 to prevent accidental removal of sensor 20. The interference fit between shoulder boss 20 and opening 160 is preferably located near the centerline of sensor 20, with the periphery of sensor 20 being supported by appropriately positioned molded lower bosses 140 to prevent the tilting of sensor 20. In a preferred embodiment shown in FIG. 4, three (3) lower bosses 140 are located at 120° angles from one another, with shoulder boss 140' being located at the center of sensor 20. Other configurations may be used as needed depending upon the particular sensor 20 being used.

Once the desired number of sensors 20 are positioned within lower portion 110, sensors 20 are connected to telemetry module 60 by telemetry lines 50. The particular number and type of telemetry lines 50 between each sensor 20 will vary depending upon the type of sensors 20 and telemetry being used. In a preferred embodiment of the invention the telemetry lines 50 are optical fibers surrounded by a protective jacket, with an input fiber and an output fiber for each sensor. Other types of telemetry lines, such as electrical, may also be used either alone or in combination.

In a preferred embodiment of the invention the telemetry lines 50 between sensors 20 and telemetry module 60 are routed using molded routing bosses 190 in interior surface 90 of lower portion 110. The use of routing bosses 190 helps to prevent movement of telemetry lines 50 during injection of acoustic medium 30 into inner volume 240, by an interference fit between telemetry lines 50 and routing boss 190, and thus helps to ensure uniform encapsulation. There is no particular shape required for routing bosses 190, the shape varying with the application. Some preferred examples are shown in FIG. 6 and FIG. 7. It is anticipated that telemetry lines 50 will be manually placed in, on, or through routing bosses 190 as the case may be, although this does not preclude the use of automation.

After telemetry lines 50 have been connected to telemetry module 60, telemetry module 60 is sealed to protect the internal workings. The sealing of telemetry module 60 may be accomplished by bottom portion 62 having been machined with sufficient flatness such that fastening lid portion 64 to bottom portion 62 using common fasteners 63 such as screws will provide a seal during injection molding with acoustic medium 30. Alternatively, sealing may be accomplished by compressing rubber o-ring seals into glands, application of an adhesive bond joint, or a combination thereof. Telemetry line port 65 and connector port 67 are both sealed by potting with an adhesive prior to fastening lid portion 64 to bottom portion 62 of telemetry module 60.

Figure 13:
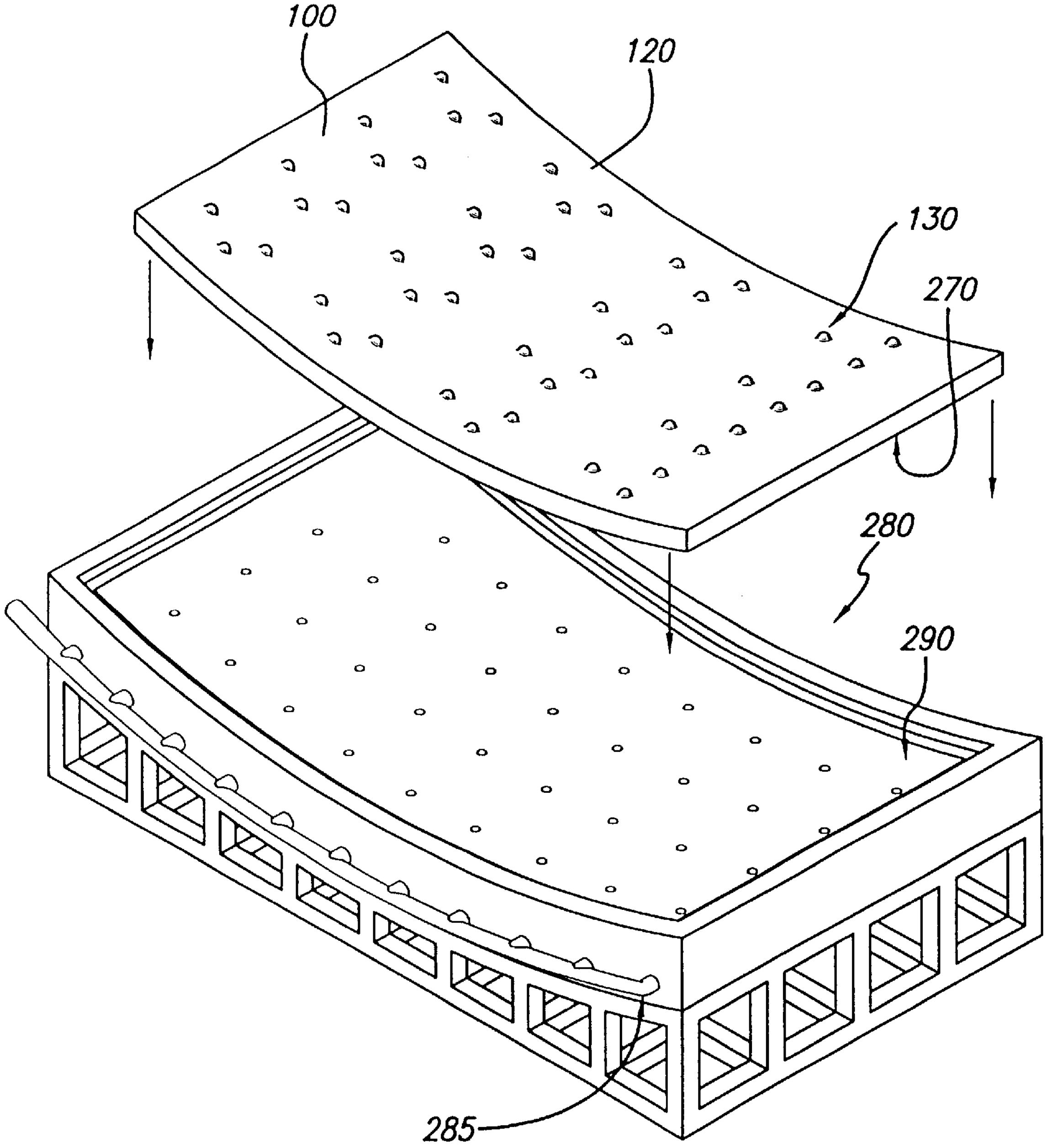
FIG. 13 An exploded view of the upper portion of the acoustic sensor module of FIG. 1 and second fixture.

Once sensors 20 have all been positioned within lower portion 110, connected to the telemetry module 60 by telemetry lines 50, and telemetry module 60 has been sealed, upper portion 120 of shell 40 is secured by its exterior surface 270 onto second fixture 280, as shown in FIG. 13. Second fixture 280 may be flat, however in a preferred embodiment of the invention the interior surface 290 of second fixture 280, upon which upper portion 120 is placed, is curved as shown in FIG. 13. The curvature of second fixture 280 surface should match the curvature of first fixture 250 which as mentioned above corresponds to the curvature of the hull to which the sensor module 10 will be attached. Integral to second fixture 280 are vacuum lines 285 through which a vacuum is pulled to secure upper portion 120 to second fixture 280. Conductive heating elements may be included within fixture 280 to facilitate elevated temperature during curing.

Figure 14:
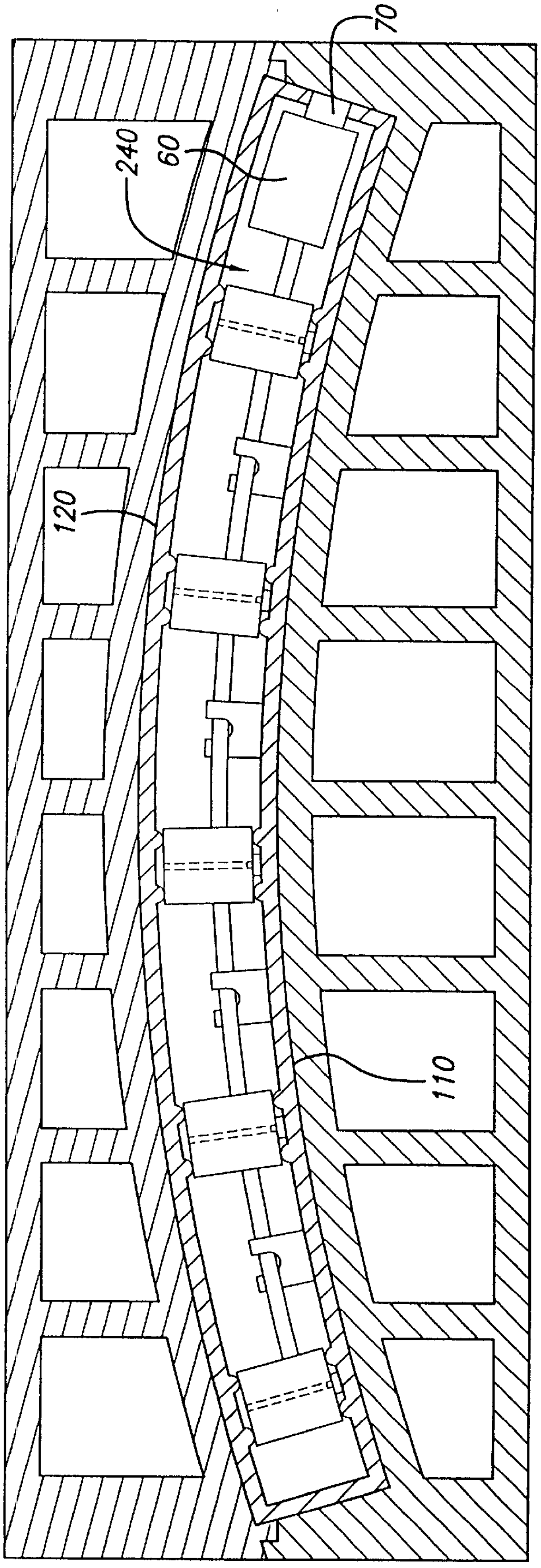
FIG. 14 A side cross-sectional view of the upper portion secured to the second fixture of FIG. 13, and the lower portion secured to the first fixture of FIG. 12, being joined together during fabrication of the acoustic sensor module of FIG. 1.

The interior surface 100 of upper portion 120 is next coated with acoustic medium 30. Upper portion 120 is placed over and in contact with lower portion 110 such that shell 40 forms and surrounds inner volume 240 as shown in FIG. 14. The placement of the upper portion 120 over lower portion 110 is also such that sensors 20 within inner volume 240 are located between upper bosses 130 and lower bosses 140 as shown in FIG. 14. As shown in FIG. 4, the preferred embodiment has three (3) upper bosses 130 disposed around the upper periphery of sensor 20 at locations approximately 120° apart. Other configurations may be used as needed depending upon the particular sensor 20 being used.

Figure 15:
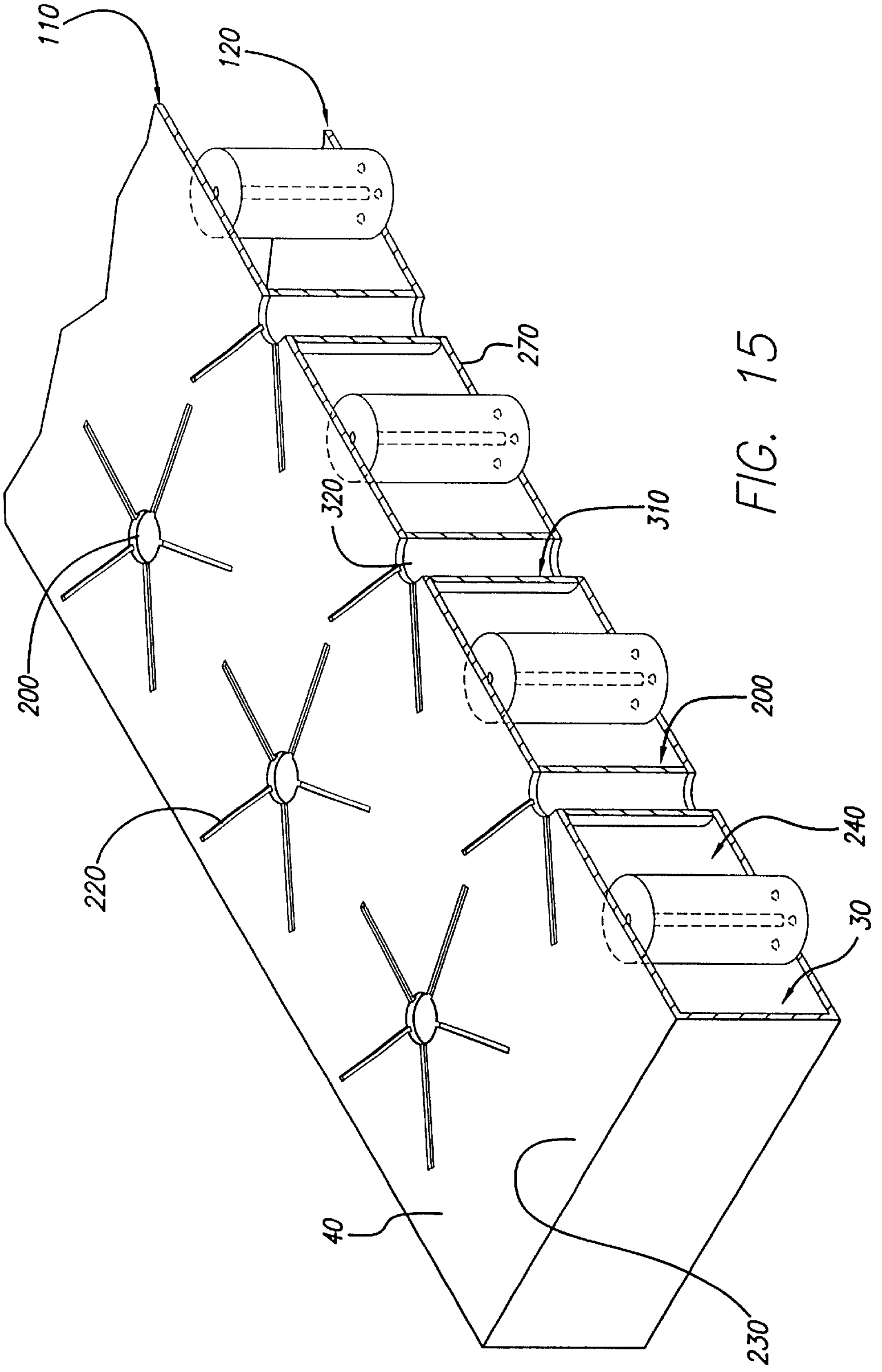
FIG. 15 A cutaway side elevation view of the acoustic sensor module of FIG. 1 showing the alignment of the molded lower channels with the corresponding upper channels in order to form an open channel from the exterior surface lower portion to the exterior surface of the upper portion.

If open channels 200 in sensor module 10 are used (and have therefore been molded into lower portion 110 and upper portion 120), placement of upper portion 120 over lower portion 110 also requires that each lower channel 310 (molded into lower portion 110) be aligned to join coextensively with its corresponding upper channel 320 (molded into upper portion 120), such that there exists an open channel 200 between exterior surface 270 of upper portion 120 and exterior surface 230 of lower portion 110. This is illustrated in FIG. 15.

After upper portion 120 and lower portion 110 are joined to form shell 40, acoustic medium 30 is injected into inner volume 240 using standard injection molding techniques until acoustic medium 30 occupies all empty space within inner volume 240. In a preferred embodiment of the invention vacuum lines 252 and pressure lines 285, forming part of first fixture 250 and second fixture 280 respectively, are used to first evacuate inner volume 240 and then to inject acoustic medium 30 into inner volume 240 under pressure to minimize the size of bubbles created by any entrapped air within inner volume 240. In order to ensure that upper portion 120 and lower portion 110 do not become detached from their respective fixtures it is desirable that the vacuum within inner volume 240 not exceed the vacuum used to secure upper portion 120 and lower 110 to their respective fixtures.

Once acoustic medium 30 has completely occupied inner volume 240, encapsulating sensors 20, telemetry lines 50 and sealed telemetry module 60, acoustic medium 30 is cured under pressure so as to form a solid and bond upper portion 120 to lower portion 110. In a preferred embodiment of the invention the curing process is accomplished by the application of heat from heating elements which are an integral part of first fixture 250 and second fixture 280. An alternative embodiment utilizes an oven in which the module is placed with its fixtures to cure acoustic medium 30. Upper portion 120 may be bonded to lower portion 110 first by allowing acoustic medium 30 to cure, followed by injection of acoustic medium 30 into inner volume 240.

In an alternative process of fabricating the invention, interior surface 290 of second fixture 280 is provided with an inert non-stick coating (such as Teflon(®) which tends not to bond with acoustic medium 30 during the curing process. The second fixture 280 is placed on the first fixture 250 forming a temporary "upper portion" of shell 40 with lower portion 110, as shown in FIG. 16. Standoffs of a cured material similar to acoustic medium 30 may be placed between sensors 20 and second fixture 280 to ensure proper location of sensors 20 between second fixture 280 and lower portion 110. Acoustic medium 30 is injected into inner volume 240, contained between lower portion 110 and second fixture 280, by way of vacuum port 252 in first fixture 250 and 285 in second fixture 280. Acoustic medium 30 is then cured. After the curing process is complete, and acoustic medium 30 has solidified within inner volume 240, second fixture 280 is removed from sensor module 10. This facilitates inspection of the now solidified acoustic medium 30 to ensure quality (i.e. uniformity of fill, no air bubbles which will adversely affect sensor module performance etc). Upper portion 120 is then installed onto second fixture 280. Interior surface 100 of upper portion 120 is then coated with acoustic medium 30, and upper portion 120 attached to second fixture 280 is placed back onto cured acoustic medium 30 and lower portion 110 attached to first fixture 250. The curing process is then repeated so as to bond upper portion 120 to acoustic medium 30 and lower portion 110 to form a completed acoustic sensor module 10.

After curing, sensor module 10 is complete and may be removed from first fixture 250 and second fixture 280. However, the present invention contemplates that sensor module 10 may remain in the fixtures for transportation, handling, storage and even installation. What follows is a glossary of terms to be used as an aid in the understanding of the disclosure and claims.

GLOSSARY OF TERMS

| | |
|---|---|
| Shell | Any object, which at least partially surrounds an inner volume, and which may be comprised of a plurality of parts. |
| Inner volume | A region substantially or completely surrounded by a shell. |
| Sensor | A device that responds to a physical stimulus (for example heat, light, sound, pressure, magnetism or a particular motion) and transmits a resulting signal (as for measurement or control), or a device for telemetry, signal conduction, signal processing, signal amplification, or the like. |
| Boss | A solid extension or protrusion from a surface, such as an interior surface of a shell. |
| Telemetry line | An object of a fixed length made of a material, or materials, which can carry power and energy signals to and from a sensor device, and which may include, for example, electrical wires or optical fibers. |
| Telemetry Module | A device to which telemetry lines may be connected and through which signals from telemetry lines may pass to other telemetry lines. It may include optical couplers and fiber splices, optical amplifiers, electronic signal conditioning and/or multiplexing circuitry. |
| Connector | Any device used to receive an electrical or optical signal and to transmit the signal with, or without, amplification or modification. |
| Routing Boss | A boss of a configuration adapted to support at least one telemetry line. |
| Interference Fit | A joint between two objects where the objects are prevented from moving in relation to one another by forces of friction. |

-continued

GLOSSARY OF TERMS

| | |
|---|---|
| Upper channel | An opening or perforation in the upper portion of a shell. |
| Lower channel | A hollow protrusion which extends from an opening or perforation in the lower portion of the shell to an open end above the interior surface of the lower portion. |
| Open channel | An unobstructed passage between the exterior surface of the upper portion of the shell and the exterior surface of the lower portion of the shell. |
| Groove | A depression in an exterior surface of the shell. |
| Upper boss | A solid extension or protrusion from the interior surface of the upper portion of the shell. |
| Lower boss | A solid extension or protrusion from the interior surface of the lower portion of the shell. |
| Acoustic medium | Any material with an acoustic impedance. |
| Fixture | A device to which something may be attached. |
| Non-stick coating | Any material or substance which tends not to form a bond with an adhesive or the acoustic medium. |
| Standoff | A solid element used to control spacing between at least two objects, such as between second fixture 280 and sensors 20. |
| Surrounds | To at least partially bound a volume. |

What is claimed is:

1. An acoustic sensor module comprising

A shell surrounding an inner volume occupied in part by an acoustic medium; said shell having an interior surface with a boss; and a sensor located in said inner volume, said sensor being in contact with said boss.

2. The acoustic sensor module of claim 1 wherein said sensor is attached to said boss by an interference fit.

3. The acoustic sensor module of claim 2 further comprising a telemetry line connecting said sensor to a telemetry module.

4. The acoustic sensor module of claim 3 further comprising a routing boss.

5. The acoustic sensor module of claim 4 further comprising an open channel extending from an upper exterior surface of said shell through said inner volume to a lower exterior surface of said shell.

6. The acoustic sensor module of claim 5 further comprising a groove on said lower exterior surface extending outward from said open channel.

7. The acoustic sensor module of claim 6 wherein said shell is comprised of an upper portion bonded to a lower portion.

8. A method of fabricating an acoustic sensor module comprising the steps of a. fabricating a shell surrounding an inner volume, said shell having an interior surface with a boss;

b. placing a sensor within said inner volume such that said sensor is in contact with said boss; and c. providing an acoustic medium which occupies at least part of said inner volume.

9. The method of fabricating an acoustic sensor module of claim 8 wherein said step of fabricating said shell further comprises the steps of a. fabricating a lower portion with an interior surface having a lower boss;

b. fabricating an upper portion with an interior surface with an upper boss;

c. joining said upper portion with said lower portion to fabricate said shell surrounding an inner volume.

10. The method of fabricating an acoustic sensor module of claim 9 wherein the step of fabricating said shell further comprises the steps of a. securing said lower portion to a first fixture;

b. securing said upper portion to a second fixture.

11. The method of fabricating an acoustic sensor module of claim 10 further comprising the steps of providing heating elements as an integral part of said first and second fixtures and curing said acoustic medium by applying heat from said heating elements.

12. The method of fabricating an acoustic sensor module of claim 10 further comprising the steps of providing vacuum and pressure lines as an integral part of said first and second fixtures and using said vacuum lines to evacuate said inner volume and said pressure lines to inject under pressure said acoustic medium into said inner volume.

13. The method of fabricating an acoustic sensor module of claim 9 further comprising the steps of a. providing a lower channel which extends from an exterior surface of said lower portion to a point above said interior surface of said lower portion;

b. providing a corresponding upper channel which extends from an exterior surface of said upper portion to said interior surface of said upper portion; and c. joining said upper portion with said lower portion such that said lower channel is joined coextensively with said corresponding upper channel such that there exists an open channel between said exterior surface of said upper portion and said exterior surface of said lower portion.

14. The method of fabricating an acoustic sensor module of claim 13 further comprising the step of providing a rigid insert in said lower channel.

15. The method of fabricating an acoustic sensor module of claim 13 further comprising the step of providing a groove on said exterior surface of said lower portion, said groove extending outward from said lower channel.

16. The method of fabricating an acoustic sensor module of claim 8 wherein said shell is fabricated with a routing boss on said interior surface, and said sensor is connected to a telemetry module by routing said telemetry line from said sensor to said telemetry module using said routing boss.

17. The method of fabricating an acoustic sensor module of claim 16 wherein said telemetry line is bonded to said routing boss.

18. The method of fabricating an acoustic sensor module of claim 8 wherein said sensor is secured to said shoulder boss by providing for an interference fit between said sensor and said shoulder boss.

19. A method of fabricating an acoustic sensor module comprising the steps of a. fabricating a lower portion with an interior surface having a lower boss;

b. placing a sensor onto said lower boss;

c. connecting said sensor to a telemetry module;

d. providing a fixture with a non-stick coating;

e. placing said fixture with said lower portion such that said fixture and said lower portion surround an inner volume;

f. injecting an acoustic medium into said inner volume;

g. removing said fixture from said lower portion;

h. joining an upper portion with said lower portion to form a shell surrounding said inner volume.

* * * * *